United States Patent
Li

(10) Patent No.: US 10,937,020 B2
(45) Date of Patent: Mar. 2, 2021

(54) WEARABLE DEVICE WITH NEAR-FIELD COMMUNICATION FUNCTION AND NEAR-FIELD COMMUNICATION CONTROL SYSTEM

(71) Applicant: Samsung Electronics Co., Ltd., Suwon-si (KR)

(72) Inventor: Qinglei Li, Beijing (CN)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 117 days.

(21) Appl. No.: 16/241,150

(22) Filed: Jan. 7, 2019

(65) Prior Publication Data

US 2019/0279195 A1  Sep. 12, 2019

(30) Foreign Application Priority Data

Mar. 6, 2018   (CN) .......................... 2018 1 0182170

(51) Int. Cl.
*H04B 5/00*    (2006.01)
*G06Q 20/32*   (2012.01)
(Continued)

(52) U.S. Cl.
CPC ......... *G06Q 20/3278* (2013.01); *G06F 1/163* (2013.01); *G06Q 20/3227* (2013.01);
(Continued)

(58) Field of Classification Search
CPC ................ G06F 1/163; G06Q 20/3227; G06Q 20/3278; G06Q 20/401; G06Q 30/0267;
(Continued)

(56) References Cited

U.S. PATENT DOCUMENTS

2014/0281138 A1* 9/2014 Karamcheti ........ G06F 11/2058
                                                            711/103
2014/0314087 A1* 10/2014 Kusano .................. H04L 45/52
                                                             370/392

(Continued)

FOREIGN PATENT DOCUMENTS

| CN | 103701505 A | 4/2014 |
| CN | 105429660 A | 3/2016 |
| CN | 105472546 A | 4/2016 |

*Primary Examiner* — Nhan T Le
(74) *Attorney, Agent, or Firm* — Harness, Dickey & Pierce, P.L.C.

(57) ABSTRACT

A wearable device having an NFC function and an NFC control system are provided. The wearable device comprises: a communication module establishing a wireless connection with an electronic terminal, and performing a transmission of data with the electronic terminal through a predefined tunnel via the established wireless connection; a processor transmitting the data received by the communication module through the predefined tunnel to an NFC controller; and the NFC controller performing a corresponding operation based on the data. The wearable device with NFC function and the NFC control system according to the exemplary embodiments of the present invention make it possible to transmit data between the NFC controller of the wearable device and the electronic terminal in a wireless manner.

13 Claims, 2 Drawing Sheets

(51) Int. Cl.
    *H04W 4/80*     (2018.01)
    *G06F 1/16*     (2006.01)
    *G06Q 20/40*     (2012.01)

(52) U.S. Cl.
    CPC ......... *G06Q 20/401* (2013.01); *H04B 5/0031* (2013.01); *H04W 4/80* (2018.02)

(58) Field of Classification Search
    CPC ..... H04W 4/80; H04B 5/0031; H04B 5/0062; H04B 5/00
    See application file for complete search history.

(56) References Cited

U.S. PATENT DOCUMENTS

| | | |
|---|---|---|
| 2016/0113045 A1 | 4/2016 | Kang |
| 2018/0310157 A1 | 10/2018 | Pan et al. |
| 2020/0126064 A1* | 4/2020 | Chang ................ G06Q 20/3278 |

* cited by examiner

WEARABLE DEVICE WITH NEAR-FIELD COMMUNICATION FUNCTION AND NEAR-FIELD COMMUNICATION CONTROL SYSTEM

CROSS-REFERENCE TO RELATED APPLICATION(S)

This application claims priority to Chinese Patent Application No. 201810182170.4, filed on Mar. 6, 2018 with the State Intellectual Property Office (SIPO), the entire disclosure of which is herein incorporated by reference.

BACKGROUND

1. Field

Example embodiments relate to a field of the electronic technology, in particular, to a wearable device with a near-field communication (NFC) function and/or an NFC control system including the same.

2. Description of the Related Art

At present, more and more mobile terminals with a near-field communication (NFC) function have been developed. Typical mobile terminals with the NFC function can be implemented to have a card emulation function, a read/write function and a peer-to-peer function.

For example, the card emulation function may be implemented to emulate the mobile terminals with the NFC function into smart cards, such that the mobile terminals replace bank cards, bus cards, access cards, or the like. The read/write function may be implemented to use the mobile terminals with the NFC function to perform as NFC tags or NFC readers. The peer-to-peer function may allow for the interaction of two devices with the NFC function to enable point-to-point data transfer, such as transferring music, exchanging pictures or synchronizing device address books.

SUMMARY

Example embodiments tend to provide a wearable device having a near field communication (NFC) function and/or an NFC control system including the same.

According to an example embodiment, a wearable device having an NFC function is provided.

In some example embodiments, the wearable device may include a communication device configured to establish a wireless connection with an electronic terminal, and to exchange data with the electronic terminal through a tunnel via the wireless connection; an NFC controller configured to perform an operation based on the data; and a processor configured to transfer the data received by the communication device through the tunnel to the NFC controller.

In some example embodiments, the data received from the electronic terminal includes an NFC controller interface (NCI) instruction generated by an NFC core stack in the electronic terminal, the NCI instruction instructing the NFC controller to perform the operation, the operation including one more of a card emulation operation, an NFC firmware upgrade operation, and an over-the-air (OTA) card issuing operation, and the NFC controller is configured to perform the operation corresponding to the NFC instruction.

In some example embodiments, the wearable device may further include a memory configured to store at least one of a plurality of NFC protocol stacks, the plurality of NFC protocol stacks including a card emulation mode protocol stack, a peer-to-peer mode protocol stack and a read/write mode protocol stack, and wherein the processor is configured to load the at least one of the NFC protocol stacks from the memory, and to perform a function corresponding to the at least one of the NFC protocol stacks.

In some example embodiments, the NCI instruction instructs the wearable device to operate in a card emulation mode, and the NFC controller is configured to operate in the card emulation mode according to the NCI instruction.

In some example embodiments, the wearable device further includes an embedded security chip connected with the NFC controller, and wherein the NFC controller is configured to establish a card emulation data tunnel between the NFC controller and the embedded security chip in response to the NCI instruction including a first instruction for establishing the card emulation data tunnel.

In some example embodiments, the communication device is configured to receive an initialization instruction from the electronic terminal through the tunnel, and to transfer the initialization instruction to the NFC controller via the processor, and the NFC controller is configured to, acquire an NFC related characteristic information in response to the initialization instruction, to transfer the NFC related characteristic information to the electronic terminal via the processor and the communication device, receive via the processor a routing table and a second instruction generated by the electronic terminal according to the NFC related characteristic information, and store the routing table into a memory of the NFC controller according to the second instruction, so as to set the NFC controller to operate in the card emulation mode.

In some example embodiments, the communication device is configured to receive the data and the NCI instruction through the tunnel from the electronic terminal such that the data includes an upgrade program package associated with NFC firmware and the NCI instruction includes an NFC firmware upgrade instruction, and the NFC controller is configured to, store the upgrade program package of the NFC firmware into a memory of the NFC controller, and upgrade the NFC firmware in response to the NFC firmware upgrade instruction.

In some example embodiments, the wearable device further includes an embedded security chip, and wherein the communication device is configured to receive a program package of a card emulation applets via the wireless connection from the electronic terminal, and the processor is configured to install the card emulation applets on the embedded security chip according to the program package of the card emulation applets such that the wearable device is configured to perform a card issuing via over-the-air.

In some example embodiments, the electronic terminal is configured to exchange the data by encapsulating the data into a first data packet based on an NCI protocol and encapsulating the first data packet into a second data packet based on a protocol associated with the wireless connection, and the wearable device is configured to transfer the data, received by the communication device through the tunnel, to the NFC controller by decapsulating the second data packet in the data, to obtain the first data packet and transmitting the first data packet to the NFC controller Alternatively, the communication module may be a bluetooth low power consumption (BLE) communication module.

According to an example embodiment, a NFC control system is provided.

In some example embodiments, the NFC control system includes an electronic terminal including a first wireless communication device and a terminal controller; and a wearable device including, a second communication device configured to establish a wireless connection with the first wireless communication device to exchange data with the terminal controller through a tunnel via the wireless connection, an NFC controller configured to perform a corresponding operation based on the data, and a processor configured to transfer the data received by the second communication device through the tunnel to the NFC controller.

Alternatively, the data may comprise an NFC controller interface (NCI) instruction for controlling an action of the NFC controller, wherein the controller may generate the NCI instruction, and transmits the NCI instruction to the processor via the wireless communication module and communication module, the processor may transmit the NCI instruction received by the communication module to the NFC controller, the NFC controller may perform an operation corresponding to the NFC instruction.

Alternatively, the NCI instruction may comprise an instruction for setting the card emulation mode, wherein the controller may generate a control instruction for setting the card emulation mode, and transmit the generated control instruction for setting the card emulation mode to the processor via the wireless communication module and the communication module, the processor may transmit the control instruction for setting the card emulation mode received by the communication module to the NFC controller, and the NFC controller may be set to operate in the card emulation mode according to the control instruction for setting the card emulation mode.

Alternatively, the wearable device may further comprise an embedded security chip connected with the NFC controller, and the control instruction for setting the card emulation mode may comprise an instruction for establishing the card emulation data tunnel, wherein the controller generates an instruction for establishing the card emulation data tunnel, and transmits the generated instruction for establishing the card emulation data tunnel to the processor via the wireless communication module and the communication module, the processor transmits the instruction for establishing the card emulation data tunnel received by the communication module to the NFC controller, and the NFC controller establishes the card emulation data tunnel between the NFC controller and the embedded security chip according to the instruction for establishing the card emulation data tunnel.

Alternatively, the control instruction for setting the card emulation mode may further comprise an initialization instruction and an instruction for setting a routing table, the data further includes the routing table, wherein the controller may generate the initialization instruction, and transmit the generated initialization instruction to the processor via the wireless communication module and the communication module, the processor transmits the initialization instruction received by the communication module to the NFC controller, the NFC controller acquires an NFC-related characteristic information in response to the initialization instruction and transmits the acquired NFC-related characteristic information to the processor, the processor transmits the NFC-related characteristic information to the controller via the communication module and the wireless communication module, the controller generates the routing table and the instruction for setting the routing table based on the NFC-related characteristic information, and transmits the generated routing table and the generated instruction for setting the routing table to the processor via the wireless communication module and the communication module, the processor transmits the routing table and the instruction for setting the routing table to the NFC controller, and the NFC controller stores the routing table into a memory of the NFC controller according to the instruction for setting the routing table, so as to set the NFC controller to operate in a card emulation mode.

Alternatively, the NFC instruction may comprise an NFC firmware upgrade instruction, and the data may further comprise an upgrade program package of the NFC firmware, wherein the controller may generate the NFC firmware upgrade instruction, and transmit the upgrade program package of the NFC firmware and the generated NFC firmware upgrade instruction to the processor via the wireless communication module and the communication module, the processor transmits the upgrade program package of the NFC firmware and the NFC firmware upgrade instruction to the NFC controller, and the NFC controller stores the upgrade program package of the NFC firmware into a memory of the NFC controller, and upgrades the NFC firmware in respond to the NFC firmware upgrade instruction.

Alternatively, the wearable device may further comprise an embedded security chip, wherein the controller may generate a card issuing instruction, and transmits the card issuing instruction and a program package of the card emulation applets to the processor via the wireless communication module and the communication module, and the processor may install the card emulation applets on the security chip according to the card issuing instruction, so as to realize the card issuing via OTA.

Alternatively, the electronic terminal may comprise a display and an input interface, wherein the display may display a predefined interface under the control of the controller, the predefined interface may comprises at least one option, the controller may receive a selection for any one option of the at least one option on the predefined interface via the input interface and acquire data corresponding to the any one option in response to the selection, and the wireless communication module may transmit the data acquired by the controller to the communication module through the predefined tunnel via the established wireless connection.

Alternatively, the at least one option may comprise at least one option of: an option for setting the card emulation mode, an option for the NFC firmware upgrade, an option for the card issuing via OTA, wherein when the controller receives a selection of the option for setting the card emulation mode via the input interface, the instruction for setting the card emulation mode may be generated, when the controller receives a selection of the option for the NFC firmware upgrade via the input interface, the NFC firmware upgrade instruction may be generated, and when the controller receives a selection of the option for the card issuing via OTA through the input interface, the card issuing instruction may be generated, wherein the options for setting the card emulation mode may comprise an option for establishing the card emulation data tunnel and an option for setting the routing table, when the controller receives, via the input interface, a selection of the instruction for establishing the card emulation data tunnel, the instruction for establishing the card emulation data tunnel may be generated, when the controller receives, via the input interface, a selection of the option for setting the routing table, the initialization instruction may be generated.

Alternatively, the wearable device may further comprise a first memory in which one of the following NFC protocol stacks may be stored: a card emulation mode protocol stack, a peer-to-peer mode protocol stack and a read/write mode protocol stack, wherein the processor may load the NFC protocol stack from the first memory, to perform a function corresponding to the loaded NFC protocol stack.

Alternatively, the electronic device may further comprise a second memory which stores a NFC core stack or an NFC full protocol stack, wherein the NCI instruction may be an NCI instruction generated by the NFC core stack in the electronic terminal.

Alternatively, the communication module is a bluetooth low power consumption (BLE) communication module.

Alternatively, the controller may encapsulate the data to be transmitted into at least one first data packet under an NCI protocol, and encapsulate the at least one first data packet into at least one second data packet under a protocol associated with the wireless connection, to transmit the at least one second data packet through the predefined tunnel via the established wireless connection, and the processor may decapsulate the second data packet in the received data, to obtain the first data packet; and transmit the obtained first data packet to the NFC controller.

The wearable device with NFC function and the NFC control system according to the example embodiments may allow transmission of data between the NFC controller of the wearable device and the electronic terminal in a wireless manner.

BRIEF DESCRIPTION OF THE DRAWINGS

The above and other objects, features and advantages of the example embodiments will become more apparent from the following detailed description, taken in conjunction with the accompanying drawings, which illustrate some of the example embodiments, in which.

DETAILED DESCRIPTION

Various example embodiments now will be described more fully with reference to the accompanying drawings, in which some example embodiments are shown.

Figure 1:
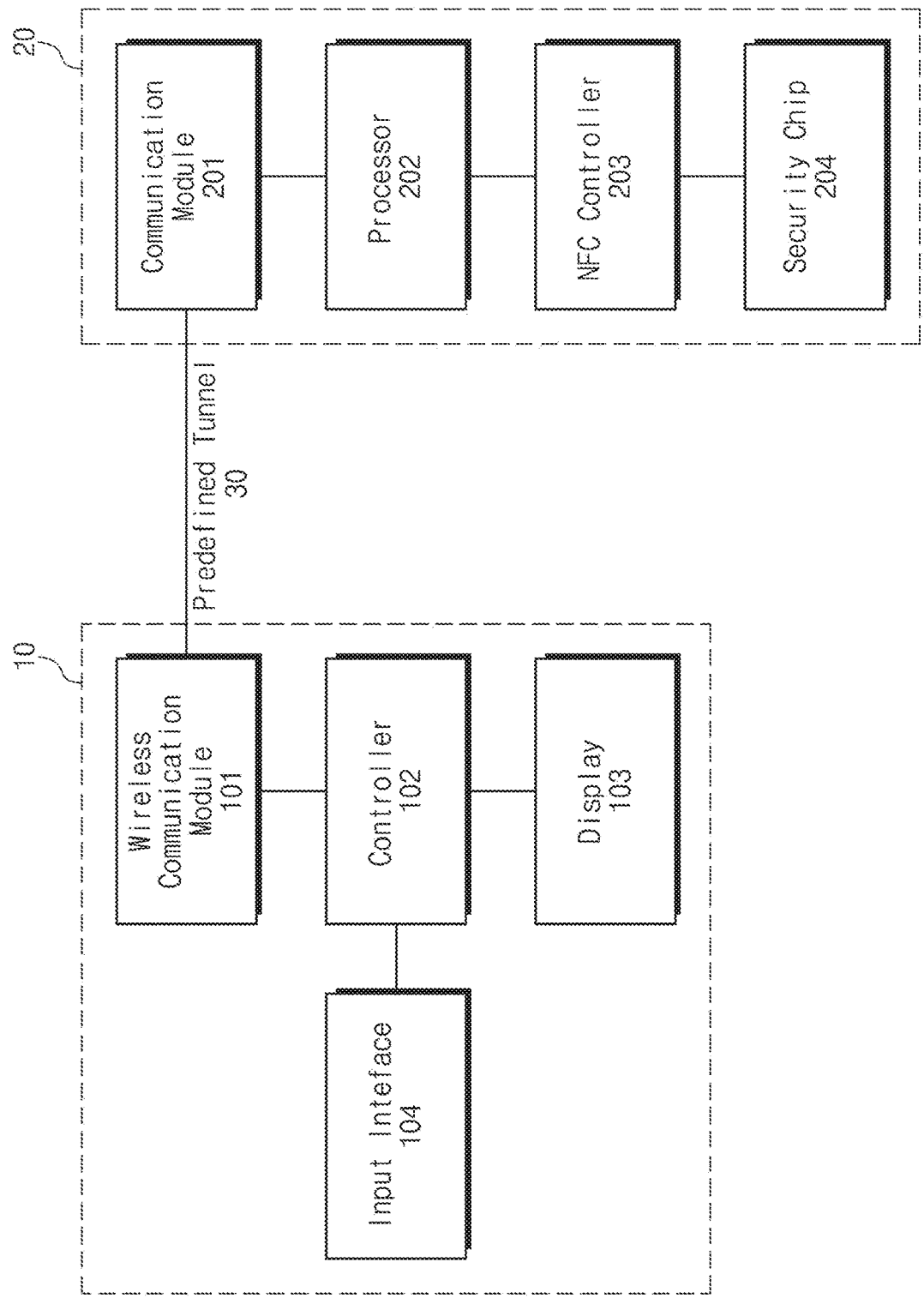
FIG. 1 illustrates a structure block diagram of a near-field communication (NFC) control system according to an example embodiment.

FIG. 1 illustrates a structure block diagram of a near-field communication (NFC) control system according to an example embodiment.

Referring to FIG. 1, the NFC control system according to an example embodiment includes an electronic terminal 10, a wearable device 20 and a tunnel 30. In some example embodiments the tunnel 30 may be a predefined tunnel. However, example embodiments are not limited thereto.

As an example, the wearable device 20 may be an electronic device with NFC function, such as a smart watch, a smart bracelet, a smart ring, a smart anklet, a smart necklace, a smart brooch, a smart hair accessory, smart glasses, a head-mounted device (HMD), or the like.

In an example embodiment, the wearable device 20 may be a low-level wearable device in which an on-chip flash memory and a random access memory (RAM) of a processor have a relative small storage capacity. Also, a display may be not included in the wearable device 20. As an example, a microcontroller unit (MCU) may be used as the processor in the wearable device 20. For example, the MCU may be Nordic nRF51822 having 32-bit ARM® Cortex™ MO CPU with a 256 kB/128 kB on-chip flash memory and 32 kB/16 kB RAM. However, example embodiments are not limited thereto.

Storage capacities of the on-chip flash memory and the RAM of the processor of the wearable device 20 are limited. For example, the storage capacity of the on-chip flash memory of the processor of the wearable device 20 may be smaller than a first set value, and that the storage capacity of the RAM of the processor of the wearable device 20 is smaller than a second set value, wherein as an example, the first set value may refer to a size of a storage space required to run a NFC full protocol stack and the second set value may refer to a size of a storage space occupied by the NFC firmware, which results in failure to run a NFC full protocol stack in the wearable device 20 and failure to store a NFC firmware in wearable device 20.

To cope with the aforementioned storage requirements, in one or more example embodiments, the NFC full protocol stack may be divided, such that only a protocol stack used in one or two operating modes of the NFC run in the wearable device 20, and a NFC core stack or a NFC full protocol stack is run in the electronic terminal 10, where the NFC core stack or the NFC full protocol stack run in the electronic terminal 10 interacts with the protocol stack in the wearable device 20 through the tunnel 30, so as to enable the electronic terminal 10 to control a NFC controller 203 in the wearable device 20 through the tunnel 30 defined by user in a wireless manner.

Here, it is to be understood that, besides the case where the wearable device 20 described above is a low level wearable device, the wearable device 20 may be a middle level wearable device or high level wearable device such that the storage capacity of the on-chip flash memory of the processor of the wearable device 20 is bigger than or equal to a first set value and the storage capacity of the RAM of the processor of the wearable device 20 is bigger than or equal to a second set value. The NFC control system described in an example embodiment may also be used to control the NFC controller 203 in the middle level or high level wearable device 20 by the electronic terminal 10 through the tunnel 30 defined by user in a wireless manner.

The process of controlling an NFC controller 203 in the wearable device 20 by the electronic terminal 10 through the tunnel 30 defined by user in a wireless manner is described in detail below with reference to FIG. 1.

The wearable device 20 is configured to perform an NFC function. The wearable device 20 includes a communication module 201, a processor 202 and an NFC controller 203. As an example, the communication module 201 may be a bluetooth low power consumption (BLE) communication module.

The wearable device 20 according to an example embodiment may further include a first memory (not shown). In an example embodiment, the NFC full protocol stack may be divided, such that only one of the NFC protocol stacks, like a card emulation (CE) mode protocol stack, a peer-to-peer (P2P) mode protocol stack and a read/write (R/W) mode protocol stack, may be stored in the first memory. In this case, the processor 202 may load the NFC protocol stack from the first memory, to perform a function corresponding to the loaded NFC protocol stack.

To transmit data between the wearable device 20 and the electronic terminal 10, the communication module 201 may establish a wireless connection with a wireless communication module 101 in the electronic terminal 10, and perform a transmission of the data with the wireless communication module 101 through the tunnel 30 via the established wireless connection.

The processor 202 is configured to transmit the data, received by the communication module 201 through the tunnel 30 from the electronic terminal 10, to an NFC controller 203.

The NFC controller 203 performs a corresponding operation based on the data received from the processor 202.

As discussed in more detail below, in some example embodiments, the operations may include one or more of a card emulation operation, an NFC firmware upgrade operation, and an over-the-air (OTA) card issuing operation.

In some example embodiments, the card emulation operation may include one or more of an establishing operation of establishing a card emulation data tunnel, an initialization operation of acquiring NFC-related characteristic information from the NFC controller 203 to generate a routing table, and a setting operation of setting the routing table in the NFC controller 203 to enable the card emulation operation.

In some example embodiments, the NFC firmware upgrade operation may include downloading an update program package associated with NFC firmware, and transmitting same to the NFC controller 203 to enable the NFC controller to upgrade the NFC firmware.

In some example embodiments, the OTA card issuing operation may include downloading and installing card emulation applets on a security chip to enable the OTA card issuing operation, the card issuing emulation applets enabling the security chip to operate as one or more of a transportation card, a bank card and an access card, and over-the-air recharging of same.

The data transmitted through the tunnel 30 between the electronic terminal 10 and the wearable device 20 may include an NFC controller interface (NCI) instruction for controlling an action of the NFC controller 203. The NFC controller 203 may perform an operation corresponding to the NFC instruction.

For example, in one or more example embodiments, to transmit the data through the tunnel 30 via the established wireless connection between the electronic terminal 10 and the wearable device 20, the NFC control system may encapsulate the data to be transmitted into at least one first data packet under the NCI protocol, and encapsulate the at least one first data packet into at least one second data packet under a protocol associated with the wireless connection, to transmit through the tunnel 30 via the established wireless connection.

A process of transmitting data through the tunnel 30 via the established wireless connection between the electronic terminal 10 and the wearable device 20 is described below with reference to FIG. 2.

Figure 2:
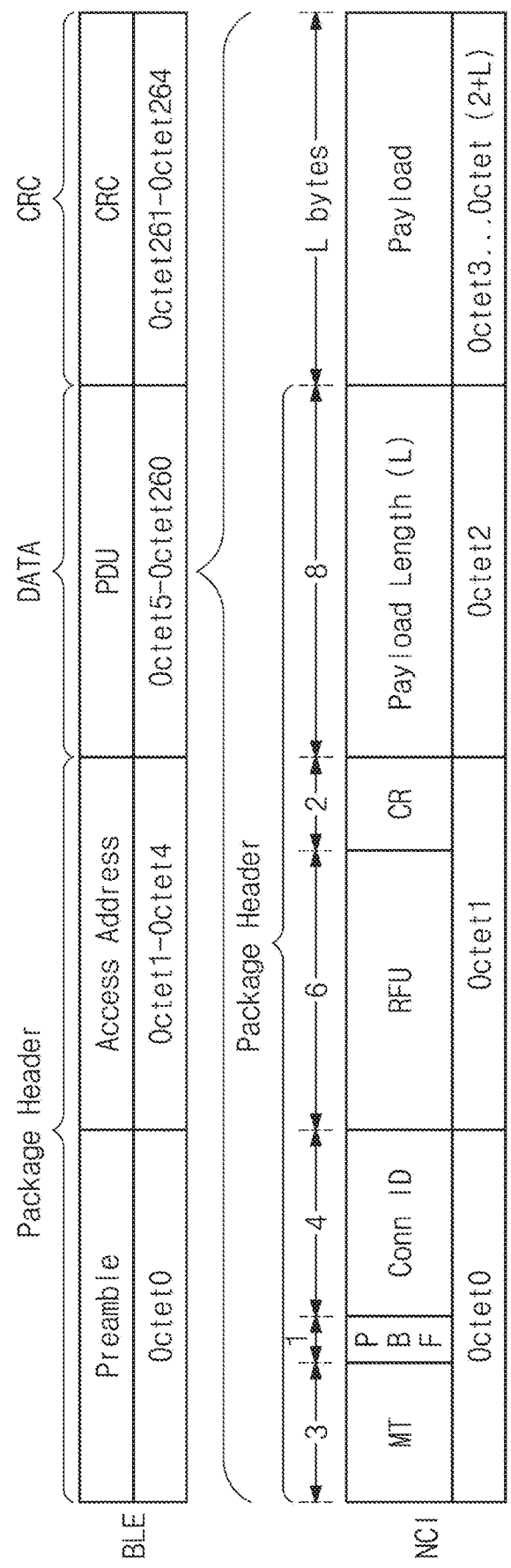
FIG. 2 illustrates a format of a data packet under a protocol associated with the wireless connection established between the electronic device and the wearable device according to an example embodiment.

FIG. 2 illustrates a format of a data packet under the protocol associated with the wireless connection established between the electronic terminal 10 and the wearable device 20 according to an example embodiment.

Referring to FIG. 2, in some example embodiments, the wireless connection established between the electronic terminal 10 and the wearable device 20 may be a Bluetooth connection. In this case, a data packet under the protocol associated with the Bluetooth connection may be a BLE data packet. However, example embodiments are not limited thereto. For example, the wireless connection may also be WiFi or a mobile data network (GPRS).

When the wireless connection is a Bluetooth connection, the process of transmitting the data through the tunnel 30 via the wireless connection may include: firstly, encapsulating the data to be transmitted into at least one first data packet (NCI data packet as shown in FIG. 2) under the NCI protocol, and encapsulating the at least one first data packet into at least one second data packet (BLE data packet as shown in the FIG. 2) under a protocol associated with the Bluetooth connection.

As shown in FIG. 2, the NCI data packet may include a package header and a data portion (payload). The package header of the NCI data packet includes a command type (MT), a flag bit (PBF, Packet Boundary Flag, used to indicate whether the NCI data packet is in their entirety), a connection ID (Conn ID, Connection Identifier, a 4-bit identifier of the logical connection), reserved bits (a reserved for future use (RFU) and CR) and a length of the effective NCI data (Payload Length(L)).

Here, the Octet represents 8 bytes, the MT in the package header of the NCI data packet occupies 3 bytes, the PBF occupies 1 byte, the Conn ID occupies 4 bytes, the RFU occupies 6 bytes, the CR occupies 2 bytes, and the Payload Length (L) occupies 8 bytes.

The BLE data packet may include a package header, a data portion (DATA) and a check (CRC, Cyclic Redundancy Check). The package header of the BLE data packet may include a data type (Preamble) and an access address.

For example, a controller 102 in the electronic terminal 10 may encapsulate data to be transmitted into NCI data packet, and then encapsulate the NCI data packet into BLE data packet. The wireless communication module 101 of the electronic terminal 10 may transmit the BLE data packet to the communication module 201 in the wearable device 20 through the established bluetooth connection.

The processor 202 in the wearable device 20 decapsulates the BLE data packet to obtain the NCI data packet, and transmits the obtained NCI data packet to the NFC controller 203. The NFC controller 203 performs the corresponding operation according to the NCI data packet.

As an example, the NCI instruction may be an NCI instruction generated by a NFC core stack in the electronic terminal 10. The NCI instruction generated by the NFC core stack in the electronic terminal 10 is transmitted to the NFC controller 203 in the wearable device 20 through the tunnel 30 in the wireless manner, to control the NFC controller 203.

In an example embodiment, the NCI instruction may include a control instruction for setting the card emulation mode, a control instruction for setting a peer-to-peer mode, and a control instruction for setting a read/write mode. For the case where only the card emulation mode protocol stack is stored in the first memory of the wearable device 20, when the NCI instruction received by the communication module 201 from the electronic terminal 10 is the control instruction for setting the card emulation mode, the NFC controller 203 may be set to operate in card emulation mode based on the control instruction. For the case where only the peer-to-peer mode protocol stack is stored in the first memory of the wearable device 20, when the NCI instruction received by the communication module 201 from the electronic terminal 10 is the control instruction for setting the peer-to-peer mode, the NFC controller 203 may be set to operate in peer-to-peer mode according to the control instruction. For the case where only the read/write mode protocol stack is stored in the first memory of the wearable device 20, when the NCI instruction received by the communication module 201 from the electronic terminal 10 is the control instruction for setting the read/write mode, the NFC controller 203 may be set to operate in read/write mode according to the control instruction.

Hereafter, referring to FIG. 1, the NCI instruction is used as, for example, the control instruction for setting the card emulation mode, so as to describe a process in which the electronic terminal 10 performs data transmission with the wearable device 20 through the tunnel 30 via the established wireless connection, thereby the wearable device 20 is implemented as a smart card.

In particular, the electronic terminal 10 may include the wireless communication module 101, the controller 102, a display 103, and an input interface 104. Here, the display 103 and the input interface 104 may be separate devices capable of realizing the display function and the input function respectively. As an example, the input interface 104 may be an input device, such as a keyboard, a touch screen and a scroll wheel. In addition, the display 103 and the input interface 104 may be integrated into a touch screen to realize the display function and the input function via a same device. As an example, the electronic terminal 10 may be an electronic device capable of running a NFC core stack and having a wireless communication function, such as a smart phone, a tablet, a personal digital assistant, or the like.

The electronic terminal 10 according to an example embodiment may further include a second memory (not shown), and the second memory stores the NFC core stack or an NFC full protocol stack. Here, it is to be understood that the electronic terminal 10 may have the NFC function, or not have the NFC function, as long as the above NFC protocol stack is stored in the second memory of the electronic terminal 10, to perform the data transmission with the NFC controller 203 in the wearable device 20.

The controller 102 of the electronic terminal 10 may load the NFC core stack or the NFC full protocol stack from the second memory, so as to generate the NCI instructions from the NFC core stack, and to interact with the NFC protocol stack in wearable device 20, to thereby set an operating mode of the NFC controller 203 in wearable device 20.

For example, the display 103 may display a desired (or, alternatively, a predefined) interface under the control of the controller 102. Here, the interface may include at least one option. By way of example, the at least one option may include at least one option of: an option for setting the card emulation mode, an option for an NFC firmware upgrade, an option for a card issuing via over-the-air (OTA).

The controller 102 receives a selection for any one option of the at least one option on the interface via the input interface 104 and acquires data corresponding to the any one option in response to the selection.

The wireless communication module 101 transmits the data acquired by the controller 102 to the communication module 201 in the wearable device 20 through the tunnel 30 via the established wireless connection, so that the NFC controller 203 performs a corresponding operation based on the data.

As an example, the data transmitted through the tunnel 30 between the electronic terminal 10 and wearable device 20 may include the NCI instructions, to control the NFC controller 203 to perform an operation corresponding to the NCI instructions.

For example, the controller 102 may generate an NCI instruction corresponding to the any one option in response to the selection. The wireless communication module 101 transmits the NCI instruction generated by the controller 102 to the communication module 201 through the tunnel 30 via the established wireless connection. The communication module 201 transfers the received NCI instruction to the processor 202, and the processor 202 transfers the NCI instruction received by communication module 201 to NFC controller 203. The NFC controller 203 performs an operation corresponding to the NCI instruction.

Hereafter, an example of the process by which the electronic terminal 10 controls the NFC controller 203 to set the operating mode through the tunnel 30 is described.

For example, when the controller 102 receives a selection for an option to set a card emulation mode on the interface via the input interface 104, the controller 102 generates an instruction for setting a card emulation mode in response to the selection. The wireless communication module 101 of the electronic terminal 10 transmits the instruction for setting the card emulation mode generated by the controller 102 to the communication module 201. The communication module 201 transfers the received instruction for setting the card emulation mode to the processor 202. The processor 202 transfers the instruction for setting the card emulation mode received by the communication module 201 to the NFC controller 203. The NFC controller 203 is set to operate in the card emulation mode according to the instruction for setting the card emulation mode.

In some example embodiments, the process by which the electronic terminal 10 controls the NFC controller 203 to be set to operate in the card emulation mode includes the process of establishing a card emulation data tunnel and the process of setting a routing table. The process of establishing a card emulation data tunnel is described below.

The wearable device 20 according to an example embodiment may further include an embedded security chip 204 connected with the NFC controller 203. In this case, the option for setting the card emulation mode may include an option for establishing the card emulation data tunnel, and the control instructions for setting the card emulation mode may include instructions for establishing the card emulation data tunnel.

For example, when the controller 102 receives a selection for an option for establishing the card emulation data tunnel via the input interface 104, the controller 102 generates an instruction for establishing the card emulation data tunnel in response to the selection. The wireless communication module 101 transmits the instruction for establishing the card emulation data tunnel generated by the controller 102 to the communication module 201. The communication module 201 transfers the received instruction for establishing the card emulation data tunnel to the processor 202 and the processor 202 transfers the instruction for establishing the card emulation data tunnel received by the communication module 201 to the NFC controller 203. The NFC controller 203 establishes the card emulation data tunnel between the NFC controller 203 and the embedded security chip 204 according to the instruction for establishing the card emulation data tunnel.

Set Routing Table

In some example embodiments, the process by which the electronic terminal 10 controls the NFC controller 203 through the tunnel 30 to set the routing table may include the following operations.

As an example, the option for setting the card emulation mode may further include an option for setting the routing table, the control instructions for setting the card emulation mode may further include an initialization instruction and an instruction for setting the routing table, and the data transmitted through the tunnel 30 between the electronic terminal 10 and the wearable device 20 may also include the routing table.

For example, when the controller 102 receives a selection of the option for setting a routing table via the input interface 104, the controller 102 generates an initialization instruction in response to the selection. The wireless communication module 101 transmits the initialization instruction generated by the controller 102 to the communication module 201 through the tunnel 30 via the established wireless connection. The communication module 201 transfers the received initialization instruction to the processor 202 and the processor 202 transfers the initialization instruction received by the communication module 201 to the NFC controller 203. The NFC controller 203 acquires an NFC-related characteristic information in response to the initialization instruction and transfers the acquired NFC-related characteristic information to the processor 202.

Here, as an example, the initialization instruction may be an instruction for acquiring the NFC-related characteristic information of the wearable device 20. The NFC-related characteristic information may include an RF interaction interface supported by a wearable device 20, the size of the storage space of the memory of the NFC controller 203 reserved to store the routing table, and the communication technology standards supported by the wearable device 20. Here, the communication technology standards may refer to the non-contact IC standard supported by the wearable device 20 (e.g., Type A and Type B as defined in ISO 14443).

The processor 202 transfers the NFC-related characteristic information to the communication module 201. The communication module 201 of the wearable device 20 transmits the NFC-related characteristic information to the wireless communication module 101 in the electronic terminal 10. The wireless communication module 101 transfers the received NFC-related characteristic information to the controller 102. The controller 102 generates a routing table and an instruction for setting the routing table based on the NFC-related characteristic information. The wireless communication module 101 transmits the routing table and the instruction for setting the routing table generated by the controller 102 to the communication module 201 through the tunnel 30. The communication module 201 transfers the received routing table and the received instruction for setting the routing table to the processor 202 and the processor 202 transfers the routing table and the instruction for setting the routing table received by the communication module 201 to the NFC controller 203. The NFC controller 203 stores the routing table into the memory of the NFC controller 203 according to the instruction for setting the routing table, so as to set the NFC controller 203 to operate in the card emulation mode.

In some example embodiments, the NFC controller 203 may further receive a security chip ID of the embedded security chip 204 in the wearable device 20 from the wearable device 20, and transmit the security chip ID to the controller 102 through the processor 202, the communication module 201 and the wireless communication module 101, so that the controller 102 generates the routing table according to the security chip ID and the NFC-related characteristic information. As an example, the routing table may include a security chip ID, a NFC operating state characteristic of the wearable device 20, a selected RF interactive interface (such as an ISO-DEP interface), communication technology standards supported by the wearable device 20 (such as Type A and/or Type B standard), and the size of the routing table is less than or equal to the size of the storage space of the memory of the NFC controller 203 reserved to store the routing table.

In some example embodiments, the NFC operating state characteristic of the wearable device 20 may refer to an operating state of the wearable device supporting the NFC card emulation function. As an example, the operating state may include at least one of: a bright screen unlocked status of the wearable device 20, a bright screen and lock screen status, an off status, a screen out state and a power off state.

Update NFC Firmware

In some example embodiments, the electronic terminal 10 may control the NFC controller 203 in the wearable device 20 through the tunnel 30 to update the NFC firmware by performing the following operations.

As an example, the NCI instruction may further include an NFC firmware upgrade instruction. The data transmitted through the tunnel 30 between the electronic terminal 10 and the wearable device 20 may further include an upgrade package of the NFC firmware.

For example, when the controller 102 receives a selection of the option for the NFC firmware upgrade via the input interface 104, the controller 102 generates an NFC firmware upgrade instruction in response to the selection and downloads an update program package for the NFC firmware. The wireless communication module 101 of the electronic device 10 transmits the NFC firmware upgrade instruction and the downloaded upgrade program package of the NFC firmware generated by the controller 102 to the communication module 201 through the tunnel 30. The communication module 201 transfers the received upgrade program package of the NFC firmware and the received NFC firmware upgrade instruction to the processor 202. The processor 202 transfers the upgrade program package of the NFC firmware and the NFC firmware upgrade instructions to NFC controller 203. The NFC controller 203 stores the upgrade program package of the NFC firmware into the memory of the NFC controller 203, and upgrades the NFC firmware in response to the NFC firmware upgrade instruction.

In some example embodiments, before the electronic terminal 10 controls the NFC controller 203 in the wearable device 20 to establish the card emulation data tunnel and to set the routing table, the electronic terminal 10 may also control the NFC controller 203 to perform a reset operation through the tunnel 30 via the established wireless connection.

For example, the NCI instruction may further include a reset instruction. The communication module 201 receives the reset instruction through the tunnel 30 and transfers the received reset instruction to the processor 202, and the processor 202 transfers the reset instruction to the NFC controller 203. The NFC controller 203 performs the reset operation (such as power-down and then power-on operation) according to the reset instruction. At this time, the NFC controller 203 may generate feedback information for indicating that the reset operation is successful, and transfer the generated feedback information to the processor 202. The processor 202 transmits the feedback information to the electronic terminal 10 via the communication module 201. After receiving the feedback information, the electronic terminal 10 performs the above process of controlling the NFC controller 203 to set the card emulation mode.

Over-the-Air (OTA) Card Issuing

In some example embodiments, the electronic terminal 10 may also issue a card via over-the-air (OTA) on the wearable device 20 through the established wireless connection. In some example embodiments, the electronic terminal 10 may perform the card issuing via OTA on the wearable device 20 through the established wireless connection by performing the following operations.

In particular, when the controller 102 receives a selection of the option for the card issuing via OTA through the input interface 104, the controller 102 generates a card issuing instruction in response to the selection and acquires a package of card emulation applets. The wireless communication module 101 of the electronic terminal 10 transmits the card issuing instruction and the package of the card emulation applets to the communication module 201 via the established wireless connection. The communication module 201 transfers the received card issuing instruction and the received package of the card emulation applets to the processor 202. The processor 202 installs card emulation applets on the security chip 204 according to the card issuing instruction, so as to realize the card issuing via OTA. As an example, the card emulation applets may include bus card applets, bank card applets, and/or access card applets.

The wearable device 20 according to an example embodiment may further include an NFC antenna (not shown) connected to the NFC controller 203.

For example, when the wearable device 20 performs a card-payment operation, the NFC antenna receives a transaction request sent by an external NFC start-up device. If the embedded security chip 204 of the wearable device 20 does not install card emulation applets corresponding to this card-payment operation, the processor 202 transmits the identification of the card emulation applets carried in the transaction request to the wireless communication module 101 of the electronic terminal 10.

The controller 102 acquires a corresponding download URL address according to the identifier of the card emulation applets, and downloads a package of the card emulation applets. The electronic terminal 10 may transmit the package of the downloaded card emulation applets to the processor 202 via the wireless communication module 101 and the communication module 201, to install the card emulation applets on the secure chip 204.

With the wearable device 20 having the NFC function and the NFC control system according to example embodiments, the electronic terminal 10 can transmit the NCI instruction to the NFC controller in the wearable device 20 in a wireless manner, to control the NFC controller in the wearable device 20 to perform the corresponding action.

Therefore, in example embodiments, the NFC control system may facilitate transmission of the NCI commands to the NFC controller wirelessly rather than via a physical connection (such as an inter-Integrated Circuit I²C communication interface).

In addition, in example embodiments, the wearable device 20 with the NFC function and the NFC control system may divide the NFC protocol stack allowing the wearable device 20 to have an on-chip flash memory and a RAM with a small-capacity to realize the NFC function, and thus can effectively reduce the production costs of the wearable device 20.

In addition, in example embodiments, the electronic terminal 10 can also realize the card issuing via OTA, and the over-the-air recharging through OTA interface, to provide users with the convenient about a card-payment operation using wearable device 20.

In some example embodiments, elements of the electronic terminal 10 and the wearable device 20 may be implemented using hardware, a combination of hardware and software, or a non-transitory storage medium storing software that is executable to perform the functions of the same.

Hardware may be implemented using processing circuity such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

For example, when a hardware device is a computer processing device (e.g., one or more processors, CPUs, controllers, ALUs, DSPs, microcomputers, microprocessors, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor. In another example, the hardware device may be an integrated circuit customized into special purpose processing circuitry (e.g., an ASIC).

A hardware device, such as a computer processing device, may run an operating system (OS) and one or more software applications that run on the OS. The computer processing device also may access, store, manipulate, process, and create data in response to execution of the software. For simplicity, one or more example embodiments may be illustrated as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

The one or more hardware devices may be specially designed and constructed for the purposes of the example embodiments, or they may be known devices that are altered and/or modified for the purposes of example embodiments.

Although example embodiments been particularly shown and described with reference to some example embodiments thereof, it will be understood by those skilled in the art that various changes in form and details may be made therein without departing from the spirit and scope of the example embodiments as defined by the appended claims.

What is claimed is:

1. A wearable device configured to perform a near-field communication (NFC) function, the wearable device comprising:
   a memory configured to store at least one of a plurality of NFC protocol stacks;
   a communication device configured to establish a wireless connection with an electronic terminal including at least an NFC core stack, and to exchange data with the electronic terminal through a tunnel via the wireless connection;
   an NFC controller configured to perform an operation based on the data; and
   a processor configured to load at least one of the plurality of NFC protocol stacks from the memory, and to transfer the data received by the communication device through the tunnel to the NFC controller such that the NFC core stack of the electronic terminal wirelessly controls the NFC controller of the wearable device through the tunnel therebetween.

2. The wearable device of claim 1, wherein
the data received from the electronic terminal includes an NFC controller interface (NCI) instruction generated by the NFC core stack in the electronic terminal, the NCI instruction instructing the NFC controller to perform the operation, the operation including one more of a card emulation operation, an NFC firmware upgrade operation, and an over-the-air (OTA) card issuing operation, and
the NFC controller is configured to perform the operation corresponding to the NFC instruction.

3. The wearable device of claim 1,
wherein the plurality of NFC protocol stacks including a card emulation mode protocol stack, a peer-to-peer mode protocol stack and a read/write mode protocol stack, and
wherein the processor is configured to perform a function corresponding to the at least one of the NFC protocol stacks loaded from the memory.

4. The wearable device of claim 2, wherein
the NCI instruction instructs the wearable device to operate in a card emulation mode, and
the NFC controller is configured to operate in the card emulation mode according to the NCI instruction.

5. The wearable device of claim 4, wherein the wearable device further comprises:
an embedded security chip connected with the NFC controller, and wherein
the NFC controller is configured to establish a card emulation data tunnel between the NFC controller and the embedded security chip in response to the NCI instruction including a first instruction for establishing the card emulation data tunnel.

6. The wearable device of claim 5, wherein
the communication device is configured to receive an initialization instruction from the electronic terminal through the tunnel, and to transfer the initialization instruction to the NFC controller via the processor, and
the NFC controller is configured to,
acquire an NFC related characteristic information in response to the initialization instruction, to transfer the NFC related characteristic information to the electronic terminal via the processor and the communication device,
receive via the processor a routing table and a second instruction generated by the electronic terminal according to the NFC related characteristic information, and
store the routing table into a memory of the NFC controller according to the second instruction, so as to set the NFC controller to operate in the card emulation mode.

7. The wearable device of claim 2, wherein
the communication device is configured to receive the data and the NCI instruction through the tunnel from the electronic terminal such that the data includes an upgrade program package associated with NFC firmware and the NCI instruction includes an NFC firmware upgrade instruction, and
the NFC controller is configured to,
store the upgrade program package of the NFC firmware into a memory of the NFC controller, and
upgrade the NFC firmware in response to the NFC firmware upgrade instruction.

8. The wearable device of claim 1, wherein the wearable device further comprises:
an embedded security chip, and wherein
the communication device is configured to receive a program package of a card emulation applets via the wireless connection from the electronic terminal, and
the processor is configured to install the card emulation applets on the embedded security chip according to the program package of the card emulation applets such that the wearable device is configured to perform a card issuing via over-the-air.

9. The wearable device of claim 1, wherein
the electronic terminal is configured to exchange the data by encapsulating the data into a first data packet based on an NCI protocol and encapsulating the first data packet into a second data packet based on a protocol associated with the wireless connection, and
the wearable device is configured to transfer the data, received by the communication device through the tunnel, to the NFC controller by decapsulating the second data packet in the data, to obtain the first data packet and transmitting the first data packet to the NFC controller.

10. The wearable device of claim 1, wherein the processor is configured to wirelessly transmit NFC-related characteristic information to the electronic device via the tunnel.

11. The wearable device of claim 10, wherein the processor is configured to,
receive a routing table from the electronic device via the tunnel, the routing table having been generated by the electronic device based on the NFC-related characteristic information transmitted thereto, and
store the routing table so as to set the NFC controller to operate in a card emulation mode.

12. An NFC control system, comprising:
an electronic terminal including a first memory configured to store at least an NFC core stack, a first wireless communication device and a terminal controller configured to load the NFC core stack from the first memory; and
a wearable device including,
a second memory configured to store at least one of a plurality of NFC protocol stacks,
a second communication device configured to establish a wireless connection with the first wireless communication device to exchange data with the terminal controller through a tunnel via the wireless connection,
an NFC controller configured to perform a corresponding operation based on the data, and
a processor configured to transfer the data received by the second communication device through the tunnel to the NFC controller such that the NFC core stack of the electronic terminal wirelessly controls the NFC controller of the wearable device through the tunnel therebetween.

13. The NFC control system according to claim 12, wherein
the wearable device is configured to wirelessly transmit NFC-related characteristic information to the electronic terminal via the tunnel, and
the electronic terminal is configured to generate a routing table based on the NFC-related characteristic information, and to transmit the routing table to the wearable device via the tunnel.

* * * * *